No. 609,320. Patented Aug. 16, 1898.
C. T. ADAMS.
VEHICLE TIRE.
(Application filed Dec. 26, 1895. Renewed July 21, 1898.)
(No Model.)
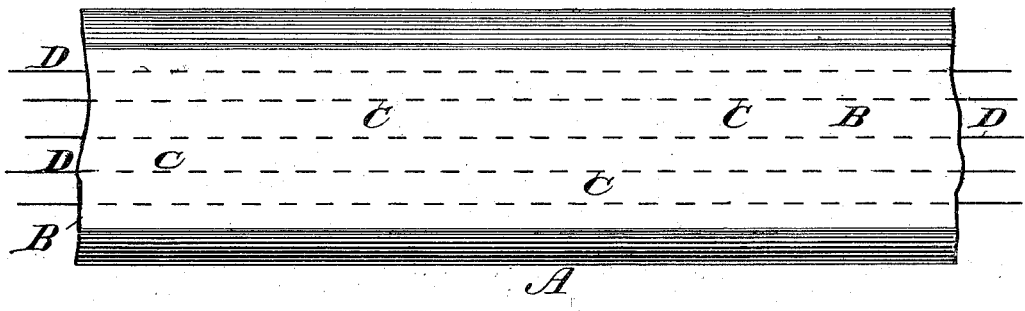
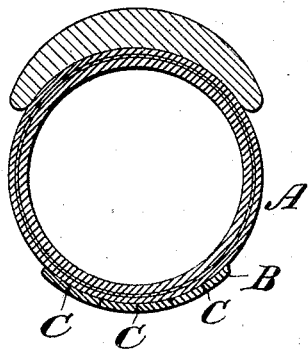
WITNESSES:
INVENTOR
BY
ATTORNEYS

United States Patent Office.

CALVIN THAYER ADAMS, OF NEW YORK, N. Y.

VEHICLE-TIRE.

SPECIFICATION forming part of Letters Patent No. 609,320, dated August 16, 1898.

Application filed December 26, 1895. Renewed July 21, 1898. Serial No. 686,533. (No model.)

*To all whom it may concern:*

Be it known that I, CALVIN THAYER ADAMS, a citizen of the United States, residing in the city, county, and State of New York, have invented a new and useful Improvement in Vehicle-Tires, of which the following is a specification.

My invention relates to means for preventing the yielding tires of bicycles and other wheeled vehicles from slipping on the roadway, as they are particularly apt to do when the roadway is smooth and wet.

The pneumatic and other yielding tires of bicycles have been provided with peripheral spikes projecting well beyond the head, so as to penetrate and give the wheel a locking hold on ice; but such projecting spikes will when wheeling on hard pavement either break off or destroy the tire when they cannot penetrate the surface or greatly increase the labor of propulsion when they do penetrate. Yielding tires have also been fitted with external metallic fittings to bear on the ground when the tire is compressed; but such fittings are too heavy, expensive, and complicated for use.

The object of my invention is to provide a tread for vehicle-tires which adds but slightly to the ordinary weight and expense of the tire, is easily applied, is durable, will not slip on smooth or wet roadways, and will not materially increase the labor of propulsion. To this end I, in accordance with my invention, embed in the material of which the yielding tread of the tire is composed a peripheral succession of hard bearings, such as metallic wire, interwoven with the rubber or yielding material of the tread, so as to lie partly on the surface of the tread, the exposed portions of the wire being substantially flush with the surface of the tread, so as to bear upon the roadway and prevent the tire from slipping thereon, and yet readily yielding with the tire to allow the rubber or flexible material of the tread to act as a cushion in the usual way.

In order that my invention may be clearly ascertained, I shall first describe in detail the mode in which I carry the invention into practice and then particularly point out the invention in the claim.

Reference is to be had to the accompanying drawings, forming part of this specification, in which corresponding parts are designated by similar letters in both figures.

Figure 1 represents a pneumatic bicycle-tire embodying my invention. Fig. 2 is a cross-sectional view of the same.

To apply my invention to an ordinary rubber pneumatic tire A, as shown in the drawings, I prefer to employ a separate tread composed of a strip B of rubber fabric or other appropriate material, which I provide with a peripheral succession of hard metallic bearings C by, in this example of my invention, weaving or stitching therethrough copper, iron, or other suitable metallic wire D in lines running lengthwise of the tread, so as to lie partly on the surface of the strip B and substantially flush with the surface thereof. I then stretch and cement the strip B thus fitted around the tire A, so that it will be integrally united and incorporated therewith. The exposed portions of the interwoven wire D will thus form hard bearings, which will bear on the roadway and effectually prevent the wheel from slipping thereon when the roadway is wet and at the same time will spring inward with the tire to allow the yielding material of the tread to bear on the roadway and act as a cushion in the ordinary way. The wire D, being interwoven with the material of the tread, will remain securely therein even when the exposed stitches are worn off, and the exposed ends of the wire will act in the same way as hard bearings to prevent the wheel from slipping.

To equip a pneumatic tire initially with my hard bearings, the same are applied to the outer tube or ply of the tire before the same is united to the inner tube or ply, so that the hard bearings will then form virtually an integral part of the body of the tire.

I claim as my invention—

The combination, with a cushioned vehicle-tire, of a tread applied to the entire periphery of the tire, and having metallic wire interwoven with itself, parts of said interwoven wire lying substantially flush with the outer surface of the tread, and forming cushioned antislip bearings covering the sides and bottom of the tread.

In testimony whereof I have hereunto set my hand the 18th day of December, 1895.

CALVIN THAYER ADAMS.

In presence of—
WILLIAM R. BAIRD,
CLARENCE L. BURGER.